Nov. 26, 1957   B. JONES   2,814,458
VALVE SEAT
Filed Aug. 13, 1956
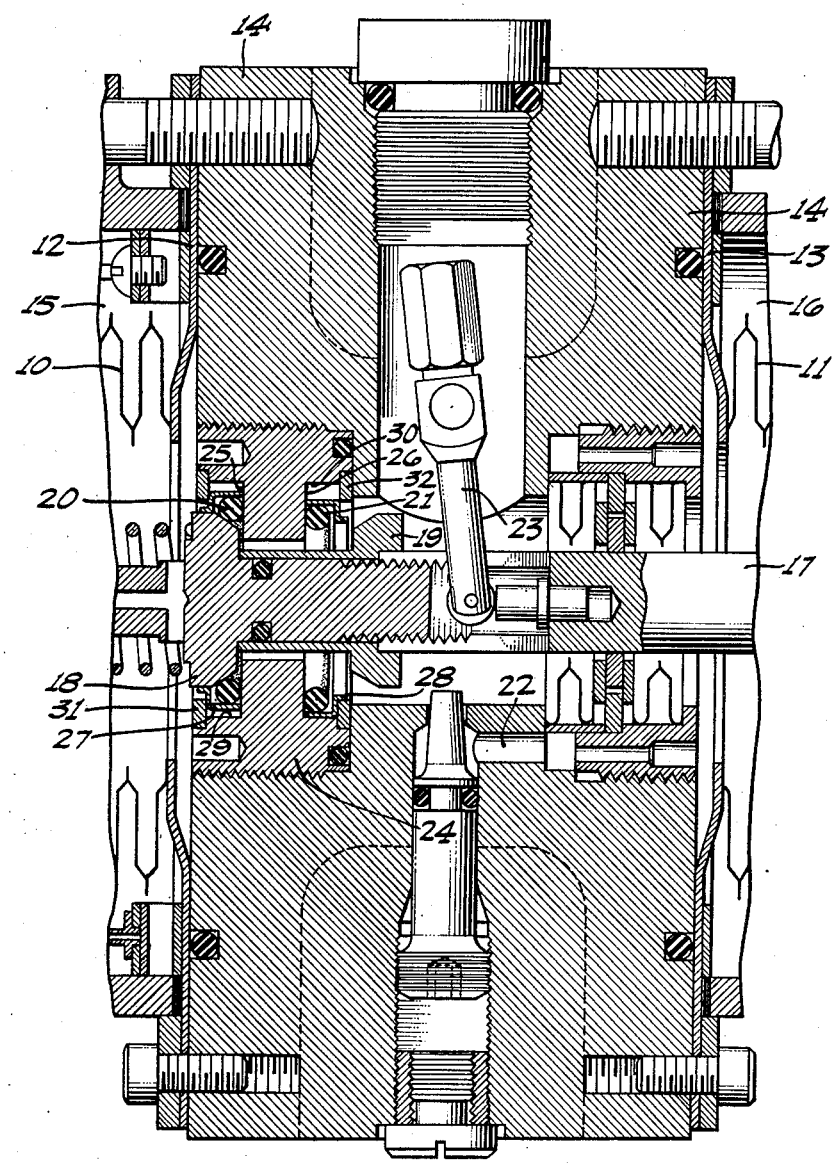
BARTON JONES
INVENTOR.
BY Hazard & Miller
ATTORNEYS

United States Patent Office 2,814,458
Patented Nov. 26, 1957

2,814,458

VALVE SEAT

Barton Jones, Los Angeles, Calif.

Application August 13, 1956, Serial No. 603,716

1 Claim. (Cl. 251—333)

This invention relates to improvements in valve seats and may be regarded as an improvement over the construction disclosed in my co-pending application for Valve Seat, Serial No. 399,220, filed December 21, 1953.

The invention has been primarily designed for use in devices which measure or which are responsive to differential pressures such as the devices which are disclosed in my United States Letters Patent No. 2,632,474, issued March 24, 1953, and my application for United States Letters Patent Serial No. 376,922, filed August 27, 1953, which matured into Patent No. 2,752,949, July 3, 1956. The invention, however, is in no way restricted to these devices and may be used wherever a tight closure between a valve closure and a seat is desired which will open readily without sticking even though the closure may be forced against its seat with considerable force.

My above described application, Serial No. 399,220 discloses a construction wherein there is a backing surface toward and away from which a tapered valve closure is movable. A rubber O-ring is positioned against the backing surface surrounding a passage therethrough through which passage fluid controlled by the valve is adapted to flow when the valve is open. This O-ring is loosely retained against the backing surface by a retainer that permits of a limited lateral movement of the O-ring with respect to the valve closure and with respect to the backing surface. As the closure is tapered and partially enters the O-ring the O-ring tends to center itself with respect to the closure as the closure approaches its seating position thereon. In centering itself the closure is intended to slide relatively to the backing surface. It sometimes occurs, however, that as the closure approaches its seat it engages one side of the O-ring in advance of engaging the other side and tends to pinch the O-ring between the closure and the backing surface before the O-ring has an opportunity to laterally slide and center itself with respect to the closure. When this occurs, the O-ring becomes distorted or radially deformed and a perfect seal between the closure and the O-ring is not obtained.

In accordance with the present invention, the O-ring is laterally movable with respect to the backing surface in centering itself with respect to the tapered closure as the closure approaches its seating position. However, it is surrounded and closely confined within a rigid retainer which is laterally movable therewith. Consequently, the retainer will clutch the O-ring in a truly circular condition with respect to the tapered closure. In this manner the O-ring is held against radial deformation or distortion and will properly center itself with respect to the closure as the closure approaches its seating position, thus assuring a proper seal. The retaining ring preferably extends over that face of the O-ring that faces toward the closure and when the O-ring and retainer are severely displaced from their centered position with relation to the closure, the retainer will be engaged by the closure in advance of the closure engaging the O-ring. Under these circumstances the retainer itself performs the initial movement of the combined O-ring and retainer toward a centering position prior to the closure engaging the O-ring. With the foregoing and other objects in view which will be made manifest in the following detailed description, reference is had to the accompanying drawing for an illustrative embodiment of the invention, wherein the figure is a partial view in vertical section illustrating the central portion of a differential pressure responsive device in which valve seats embodying the present invention have been installed.

Referring to the accompanying drawings wherein similar reference characters designate similar parts throughout, there is illustrated in the figure a portion of a differential pressure responsive device wherein there are two metallic bellows 10 and 11, the inner sides of these bellows being mounted on plates 12 and 13 which are secured against opposite sides of a partition 14 which divides a surrounding housing into two chambers 15 and 16 in which the bellows 10 and 11 are disposed respectively. The pressures between which a differential may exist are conducted to the two chambers 15 and 16 respectively and are effective on the exteriors of the bellows 10 and 11. The outer ends of these bellows may be rigidly connected together by a connecting rod or stem 17 to cause the outer ends of the bellows to move in unison. This construction, however, is optional and if desired, the stem 17 need not be connected to more than one bellows such as, for example, the bellows 10. If the pressure that is admitted to the chamber 15 is in excess of the pressure in the chamber 16, the bellows 10 will tend to collapse. Conversely, if the pressure in the chamber 16 is in excess of the pressure in the chamber 15, the bellows 11 will tend to collapse. If the outer ends of the bellows are connected by the connecting rod or stem 17, collapsing movement of one bellows will be transmitted thereby to the other bellows urging the other bellows to expand. In order to prevent rupture or permanent damage to either bellows when the differential in pressures in the chambers 15 and 16 becomes excessive, a passage is formed through the partition 14 which provides for communication between the two bellows and this passage as well as the bellows are filled with a clean liquid, a liquid being relatively incompressible. Tapered closures 18 and 19 are provided on the stem or connecting rod 17 which face in opposite directions and these tapered closures are adapted to seat on seats provided by O-rings 20 and 21 respectively formed of rubber or rubber-like materials. Thus, if the pressure in chamber 15 becomes highly excessive tending to collapse bellows 10 to an excessive extent, the stem 17 will move from left to right as viewed in the figure and seat on the O-ring 20, confining the incompressible liquid in the bellows 10 and preventing its collapse to such an extent that the bellows would become damaged. Conversely, if the pressure in the chamber 16 should become excessive with respect to the pressure in chamber 15, the stem 17 if it is connected thereto will move the closure 19 from right to left as viewed in the figure causing the closure to seat on the O-ring 21 and entrap liquid that is incompressible in the passage and in the bellows 11. If the stem is not connected to the outer end of bellows 11 as in the optional construction above mentioned, bellows 11 will collapse forcing liquid therefrom through the valve-controlled bypass 22 and through the O-rings 21 and 20 into the bellows 10 until the bellows 10 has expanded sufficiently to cause the stem to move the closure 19 into engagement with the O-ring 21. This seating of the closure 19 on the O-ring 21 entraps the incompressible liquid in the passage and in the partially collapsed bellows 11 preventing further collapse of the bellows 11 and further expansion of the bellows 10. The movement of the stem or connecting rod 17 is indicative of the differential in the pressures existing in the chambers 15 and 16 and is transmitted to the exterior of the housing such as by an arm 23 that is swingably mounted in the passage by means of a torque tube not shown.

The invention concerns the construction of the seat for each of the closures 18 and 19 which are both tapered and which are adapted to seat in moving in opposite directions. In my prior application Serial No. 399,220, the O-rings which formed the seats merely surrounded the passage through which fluid was intended to flow and were loosely retained against a backing surface so that a limited amount of lateral movement was permitted by the O-rings in centering themselves with respect to their respective closures as the closures approached their respective seating positions. As above explained, however, if the O-rings were in vertical positions they tended to settle by gravity to the bottom and consequently, as a closure approached its seat the upper portion of the O-ring would sometimes be engaged by the closure and pinched between the closure and the backing surface in such a manner that the O-ring was frictionally held against centering itself with respect to the closure. This resulted in a distortion or radial deformation of the O-ring and a perfect seal between the O-ring and the closure would not always be obtained. In accordance with the present invention a plug 24 is threaded into the partition 14 and this plug provides oppositely facing backing surfaces 25 and 26 for the closures 18 and 19 respectively. The O-rings 20 and 21 are loosely positioned against these backing surfaces and are surrounded by closely fitting metallic retainers 27 and 28 respectively. The outside surfaces of the retainers are slightly spaced from the cavities in the plug 24 in which they are disposed so that the clearance spaces 29 and 30 permit of some lateral movement not only of the O-rings 20 and 21 but also of their respective retainers 27 and 28. The retainers 27 and 28 have portions extending over the faces of the O-rings that face toward their respective closures and portions which extend some distance in advance thereof. The minimum inside diameters of the retainers are not such as to prevent the closures 18 and 19 from passing therethrough to engage the O-rings. However, they are sufficiently close to the outside diameters of the closures so that the closures will initially engage the retainers before they engage their O-rings as the closures move toward their respective seating positions. The O-rings and retainers are retained in their respective cavities in the plug 24 by retaining rings 31 and 32 which are staked or otherwise secured in the opposite faces of the plug.

With the improved construction it will be appreciated that if conditions are such as to cause the stem 17 to move the closure 18 from left to right as viewed in the figure, the closure may engage the outer end of the retainer 27 and by virtue of its tapered surface cam the unit formed by the O-ring 20 and retainer 27 into an approximately centered position with respect thereto. As the closure 18 moves further toward its seat the tapered seating surface of the closure will ultimately engage the interior of the O-ring and cause the unit formed by the O-ring and its retainer to be completely centered with respect to the closure. When the closure engages the O-ring it presses the O-ring against the backing surface and a perfect seal is established not only between the O-ring and the closure but between the O-ring and the backing surface to confine liquid in the bellows 10.

In a similar manner if the closure 19 moves from right to left as viewed in the figure, the O-ring 21 and its retainer 28 slide on the backing surface and will be centered with respect to the closure just before the closure completely seats. Consequently, good seals between the closure and the backing surface are obtainable. From the above described construction it will be appreciated that the retainers which are laterally movable with the O-rings not only hold the O-rings against distortion or radial deformation but will also assist in largely centering the unit composed of the O-ring and the retainer with respect to the closure as the closure moves toward its seating position.

It will be appreciated that even if the closure is forced against the O-ring with considerable force due to a high excess of differential in pressures admitted to the chambers 15 and 16, that the O-ring is held against expansion by the retainer and when conditions in the chambers return to normal causing the closures to recede from their seating positions, the retainers are effective to strip the O-rings from the closures.

Various changes may be made in the details of construction without departing from the spirit or scope of the invention as defined by the claim.

I claim:

A valve comprising a tapered valve closure, and a seat toward and away from which the closure is movable, said seat comprising a passaged backing surface through the passage of which fluid controlled by the valve is adapted to flow, a rubber O-ring positioned against the backing surface and surrounding the end of the passage terminating on said surface, said O-ring being adapted to seat upon said surface and to be seated upon by the closure, a stiff retainer surrounding the O-ring resisting radial deformation thereof by the closure, and means retaining the O-ring and the retainer adjacent the backing surface but permitting the retainer and O-ring to move laterally relatively to the backing surface whereby the retainer and O-ring may become centered with respect to the closure as the closure seats thereon, the retainer extending inwardly over that side of the O-ring which faces toward the valve closure a sufficient distance so as to be engaged by the closure in advance of the closure's engagement with the O-ring if the O-ring and retainer are severely off-center with respect to the closure as the closure starts to close.

References Cited in the file of this patent

UNITED STATES PATENTS 2,330,610  Natter _____ Sept. 28, 1943

FOREIGN PATENTS 12,911  Great Britain _____ June 7, 1904